May 11, 1926.

W. F. MOTTIER 1,583,989

GEAR SHIFTING DEVICE

Filed Feb. 1, 1924

Inventor

Walter F. Mottier

By

Hardway Rather

Attorneys

May 11, 1926. 1,583,989
W. F. MOTTIER
GEAR SHIFTING DEVICE
Filed Feb. 1, 1924  2 Sheets-Sheet 2
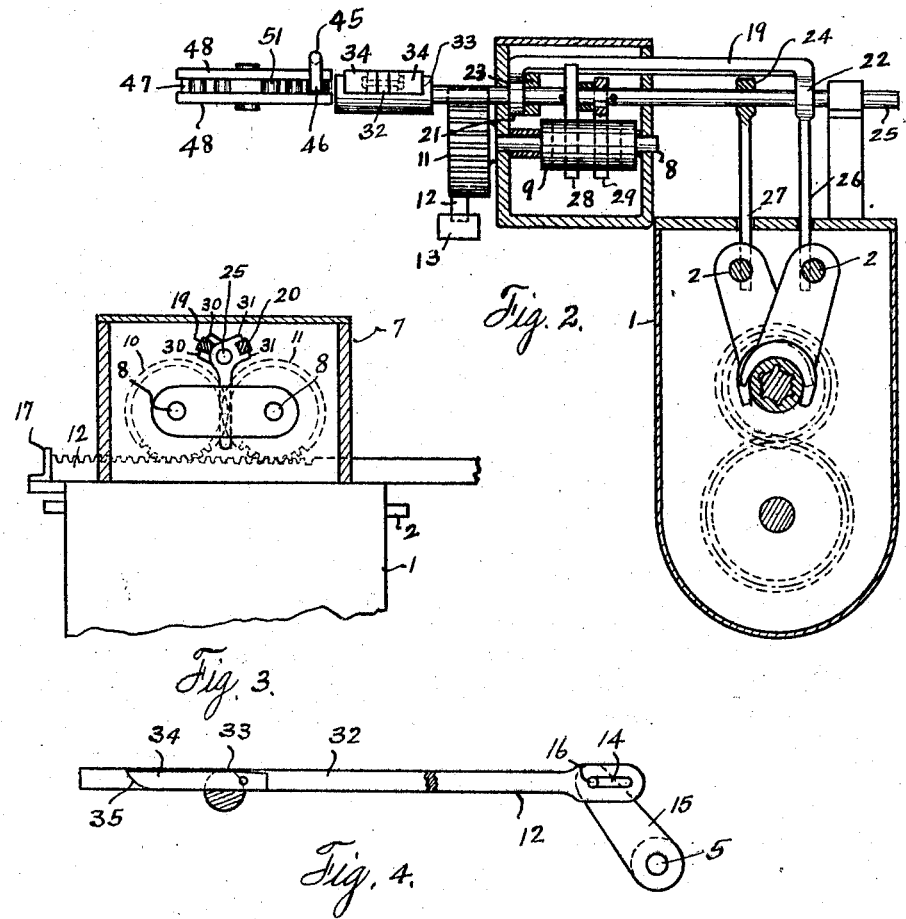
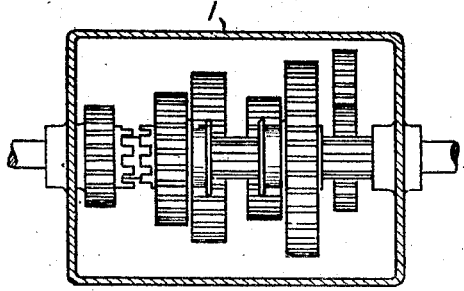
Inventor
Walter F. Mottier
By
Hardway Cath
Attorneys Patented May 11, 1926.

1,583,989

UNITED STATES PATENT OFFICE.

WALTER F. MOTTIER, OF EL CAMPO, TEXAS.

GEAR-SHIFTING DEVICE.

Application filed February 1, 1924. Serial No. 690,095.

This invention relates to new and useful improvements in a gear shifting device.

One object of the invention is to provide a device of the character described through which the gears of a transmission may be easily shifted to obtain different relative rates of speed between the driving and driven members of the transmission.

Another object of the invention is to provide a device of the character described, embodying a selective mechanism through which the desired gear ratio may be selected, a clutch actuating pedal, and a mechanism actuated by said pedal through which the desired gear ratio is selected, and the transmission gear shifted to obtain the desired gear combination.

A further feature of the invention resides in the combination of a preliminary gear selective mechanism, a clutch actuating and gear selecting pedal, and a gear shifting mechanism arranged to be actuated by said pedal through which combination the mechanism for the desired gear ratio may be partially aligned in advance, and the clutch disengaged and the alignment of the mechanism for the gear selection completed, and the selected gear combination obtained by manipulation of said pedal.

With the above and other objects in view, this invention has particular relation to certain novel features of construction, operation and arrangement of parts, an example of which is given in this specification and illustrated in the accompanying drawings, wherein:—

Figure 2 shows a rear view of the transmission case, with the gear shifting mechanism applied thereto.

Figure 3 shows a cross sectional view taken on the line 3—3 of Figure 2.

Figure 4 shows a sectional view of the gear shifting shaft, and shifting means therefor; and, Figure 5 shows a sectional view of the transmission mechanism.

Figure 1:
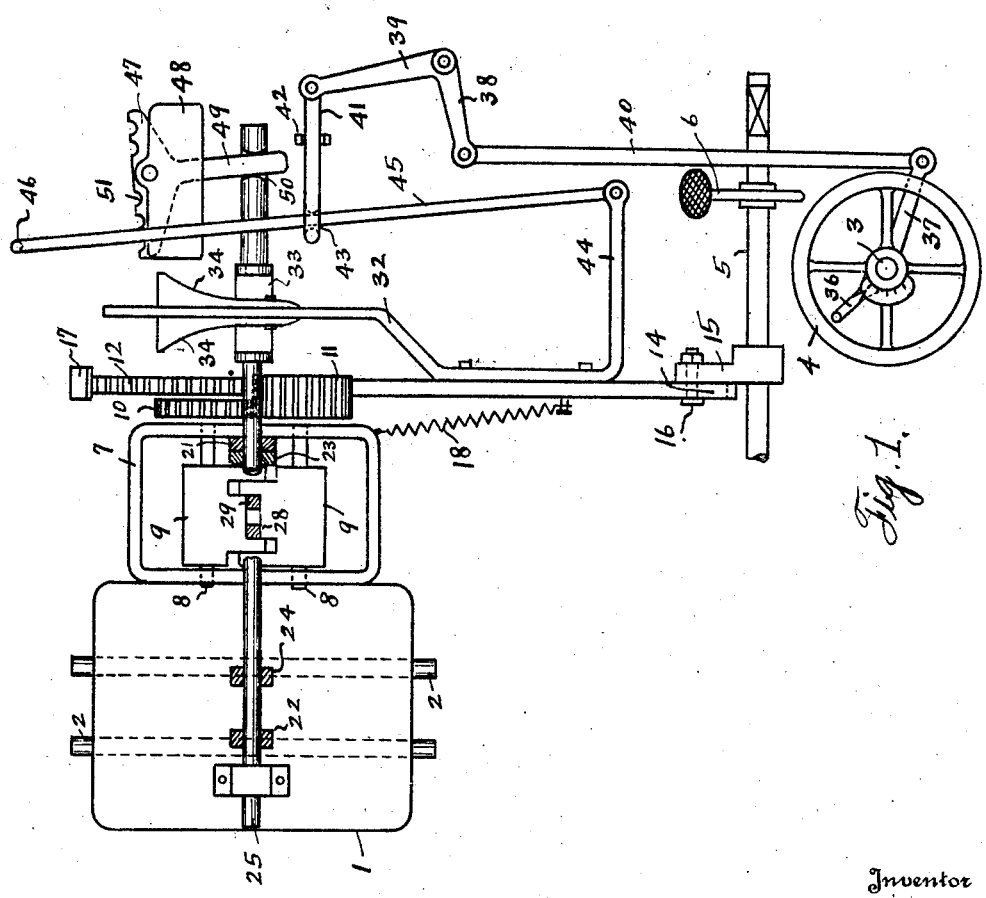
Figure 1 shows a plan view of the device, partly in section.

Referring now more particularly to the drawings, wherein like numerals of reference designate similar parts in each of the figures, the numeral 1 designates the transmission case of the ordinary motor vehicle, slidably mounted in which are the gear shifting rods 2, 2. The transmission gearing in the case 1 is of the ordinary type. This invention has to do with the shifting mechanism only, and is not concerned with the particular type of transmission with which the vehicle is equipped.

The numeral 3 designates the steering column and the numeral 4 refers to the steering wheel mounted thereon. There is a transverse clutch actuating shaft 5 which may be actuated by the foot pedal 6, fixed thereon.

Adjacent the transmission case, and elevated slightly above it, there is a housing 7 with the transverse rocker shafts 8, 8, mounted therein. Fixed on these respective shafts are the intermeshing cam members 9, 9, of a construction, and provided for a purpose, hereinafter explained. Fixed upon the outer ends of these shafts 8 are the intermeshing spur gears 10 and 11, the latter of which is thicker than, and extends outwardly beyond the former, and arranged underneath and in mesh with the extended portion of the gear 11 there is a rack member 12 which rides on a suitable bearing 13. The forward end of this rack member has a transverse slot 14 and fixed to the clutch shaft 5 there is an arm 15. The free end of this arm has a bearing pin 16 which works through the slot 14. The pin 16 normally rests at the rear end of the slot 14 and the rear end of the rack member 12 rests against the stop 17. When the pedal 6 is depressed the clutch will first be disengaged, the pin 16 traveling in the slot 14; a further pressure on the pedal 6 will cause a forward movement of the rack member 12, causing a consequent rotation of the gears 10 and 11, causing the cam members 9 to open, or swing around out of mesh. At the same time the pull spring 18 attached at its respective ends to the housing 7 and the rack members 12, will be placed under tension, and when the pedal 6 is released this pull spring will cause a reverse motion of the rack member 12, causing the cam members 9 to swing together and intermesh.

The numerals 19 and 20, respectively, designate the shift yokes which are formed with end bearings 21, 22 and 23, 24, respectively, loosely mounted on the shift rod 25. Fastened to the bearings 22 and 24, respectively, and depending therefrom, are the shift arms 26 and 27, respectively, which work through suitable slots in the top of the transmission case 1 and have connection, in the conventional manner, with the gear shifting rods 2, 2, of the transmission mechanism.

Pivoted on and depending from the shift rod 25 there are the arms 28 and 29, and the arm bearings have spaced extensions 30, 30 and 31, 31, forming open sliding bearings which receive the respective yokes 19 and 20. These arms 28 and 29 depend between the cam members 9, 9 and are actuated thereby and in turn actuate the yokes 19 and 20 about the axis of the shift rod 25, which, in turn, operate the shift arms 26, 27, and thereby shift the transmission gears. The arms 28, 29, are retained against lengthwise movement on the rod 25.

Fastened to the side of the rack bar 12 there is a neutralizing bar 32 whose rear end rests in, and works through a long bearing notch 33 in the upper side of the shift rod 25. Pivoted at their forward ends to opposite sides of the bar 32 are the rearwardly widening, wedge shaped dogs 34, 34 whose free ends are upwardly beveled, as at 35. As the rack bar 12 moves forwardly and the cam members are opened up, or carried out of mesh, the neutralizing bar 32 is carried forward, moving through the bearing notch 33, and the wedge shaped dogs, operating against the ends of the said bearing shift the rod 25 into what will be called neutral position.

On the steering wheel there is a manual shift lever 36, which is rigidly connected to a lateral arm 37. There is a suitable pivoted bell crank having the arms 38 and 39. A link 40 is pivoted, at one end, to the free end of the arm 37, at its other end to the free end of the arm 38. Pivoted at one end to the free end of the arm 39, there is a transversely movable link 41, which works through the guide 42 and whose other end has a bearing 43. The forward end 44 of the neutralizing bar 32 is overturned and pivoted to said overturned end there is a shiftable rod 45 which works through the bearing 43, and whose rear end is downwardly turned forming a depending stud 46. A shift rack 47 is pivoted between the plates 48, 48, which form a housing for said rack. This rack has a forwardly extending arm 49 which works through a bearing 50 in the corresponding end of the shift rod 25. The rear edge of the shift rack 47 projects rearwardly beyond the plates 48, and has the open bearings or notches as 51, a notch corresponding to each position of the transmission, that is for neutral, reverse and first, second and third speed ahead.

When it is desired to change the gear ratio of the transmission mechanism to obtain any desired speed, or neutral, the lever 36 is moved correspondingly which will operate through the mechanism described, to shift the rod 45 and carry the stud 46 opposite the proper notch 51 to effect the desired result. The pedal 6 is then depressed and this will operate, as described, first to disengage the clutch and then to open, or carry out of mesh, the cam members 9, 9. Meanwhile the neutralizing rod 25 will be shifted lengthwise, through the mechanism described, into neutral position. Thereupon the stud 46 will engage in the opposing notch 51, and the shift rack will be actuated to shift the rod 25 into position to obtain the desired gear selection. This movement of the rack will be positively stopped by the engagement of the stud 46 with the rear edges of the plates 48. Upon release of the pedal the spring 18 will retract the rack bar 12 and neutralizing bar 32, as well as the rod 45. The rear ends of the dogs 34 are upwardly beveled so that, as retracted, if the bar 32 is out of center of the bearing notch 33 the dog adjacent the near end of said bearing will ride up over the rod 45 and drop back into normal position, in alignment with the bar 32, when the dogs have been carried back to original, or inactive position. As the rack bar 12 is retracted, it will actuate the gear wheels 10 and 11 and close the cam members 9 into intermeshing position, and as they are brought into this position they will actuate the arms 28, 29 to effect the desired shifting of the transmission gears, through the yokes 23, 24, and the shift arms 26, 27 connected to said yokes.

The forms of the cam members 9 are shown in Figure 1. It may be stated, however, that they are so formed that when they close about the arms 28, 29, they effect certain relative movements of said arms, about the axis of the shift rod 25, said movements depending on the positions to which said arms have been previously moved, or shifted. And the cams are of such formation that they will act upon said arms 28, 29 to bring about the desired combinations of movement of them to effect the various changes of the transmission gears to give the various gear connections for reverse, and first, second and third speed ahead, as well as for neutral position of the transmission gears.

What I claim is:

1. In a gear shifting device, shift arms in operative connection with the gears to be shifted, shiftable members in operative connection with said arms, means adapted to actuate said members to effect relative movement of said arms and means for moving said shiftable members into different positions in relation to said actuating means, and means, under the control of the operator, for predetermining the operation of said moving means, and through which said positions may be selected.

2. In a gear shifting device, shifting means in operative connection with, and adapted to move the gears to be shifted; shiftable members in operative connection with said means; means adapted to actuate said members to effect relative movement of said shifting means; means for moving said shiftable members into different positions in relation to said actuating means; manually actuated mechanism for releasing said actuating means from said shiftable members to permit the shifting of said members, and means under the control of the operator for predetermining the operation of said moving means and through which said positions of said members may be preselected.

3. In a gear shifting device, shifting means in operative connection with, and adapted to move the gears to be shifted; shiftable members in operative connection with said means; means adapted to actuate said members to effect relative movement of said shifting means; means for moving said shiftable members into different positions in relation to said actuating means; means under the control of the operator for predetermining the operation of said moving means and through which said positions of said members may be preselected; manually actuated mechanism for releasing said actuating means from said shiftable members to permit the shifting of said members; means thereafter automatically operating said actuating means into operative engagement with said shiftable members to actuate the same and thereby shift the corresponding transmission gears.

4. In a gear shifting device, shifting means in operative connection with, and adapted to move the gears to be shifted; shiftable members in operative connection with said means; means adapted to actuate said members to effect relative movement of said shifting means; means for moving said shiftable members into different positions in relation to said actuating means; and means, under the control of the operator, for pre-determining the operation of said moving means and through which said positions of said members may be pre-selected.

5. In a gear shifting device, shifting means in operative connection with, and adapted to move the gears to be shifted; shiftable members in operative connection with said means; means adapted to actuate said members to effect relative movement of said shifting means; means for moving said shiftable members into different positions in relation to said actuating means; manually actuated mechanism for releasing said actuating means from said shiftable members to permit the shifting of said members; means thereafter automatically operating said actuating means into operative engagement with said shiftable members to actuate the same and thereby shift the corresponding transmission gears; and means, under the control of the operator for predetermining the operation of said moving means and through which said positions of said shiftable members may be previously selected.

6. A gear shifting device comprising gearing for establishing a plurality of driving relations, means for shifting said gears to establish any of said relations, said means comprising gear shifting members in operative connection with said gears, shiftable members in operative connection with said gear shifting members, means adapted to actuate said shiftable members, to effect relative movement of said gear shifting members, means for moving said shiftable members into different positions in relation to said actuating means, and controllable means for predetermining the operation of said moving means and through which said positions may be pre-selected.

7. A gear shifting device comprising gearing for establishing a plurality of driving relations, means for shifting said gears to establish any of said relations, said means comprising a clutch actuating pedal; gear shifting members in operative connection with said gears, shiftable members in operative connection with said gear shifting members, means adapted to actuate said shiftable members to effect relative movement of said gear shifting members, means for moving said shiftable members into different positions in relation to said actuating means, means under the control of the operator for pre-determining the operation of said moving means, and through which said positions of said shiftable members may be pre-selected, operative connections between said pedal and said actuating means, and shiftable members through which the operation of said shaft through its cycle of movement operates to disengage the clutch to release said actuating means from said shiftable members to shift said shiftable members, and to operate said actuating means into operative relation with said shiftable members in succession.

8. A gear shifting device comprising gearing for establishing a plurality of driving relations, shifting means in operative connection with, and adapted to move the gears to be shifted, shiftable members in operative connection with said means, means adapted to actuate said members to effect relative movements of said shifting means, means for moving said shiftable members into different positions in relation to said actuating means, a clutch actuating pedal operatively connected to said actuating means through which the clutch may be first released and thereafter said actuating means released from said shiftable members to permit the shifting thereof, means thereafter automatically operating said actuating means into operative engagement with the shiftable members to actuate the same and thereby shift the corresponding transmission gear, and means under the control of the operator for pre-determining the operation of said moving means and through which said positions of said shiftable members may be previously selected.

9. A gear shifting device comprising gearing for establishing a plurality of driving relations and means for shifting said gears to establish any of said relations, said means comprising gear shifting members operatively connected to said gears, shiftable members in operative connection with said gear shifting members, actuating means provided to operate the shiftable members, manually operable means operatively connected with said actuating means and through the manual operation of which the actuating means may be released from said shiftable members to permit the shifting thereof, said manually operable means being also operatively connected with said shiftable members and operating to shift said members; means for automatically operating the actuating means, thereby operating the shiftable members to shift said gears, through the gear shifting means.

10. A gear shifting device comprising gearing for establishing a plurality of driving relations and means for shifting said gears to establish any of said relations, said means comprising gear shifting members operatively connected to said gears, shiftable members in operative connection with said gear shifting members, actuating means provided to operate the shiftable members, manually operable means operatively connected with said actuating means and through the manual operation of which the actuating means may be released from said shiftable members to permit the shifting thereof, said manually operable means being also operatively connected with said shiftable members and operating to shift said members; means for automatically operating the actuating means, thereby operating the shiftable members to shift said gears, through the gear shifting means; and means, under the control of the operator, through which the position to which said shiftable members will be shifted, may be previously determined.

11. A gear shifting device comprising gearing for establishing a plurality of driving relations, and means for shifting said gears to establish any of said relations, said means comprising gear shifting members in operative connection with the gears to be shifted, shiftable members in operative connection with said gear shifting members; cams being adapted to actuate said shiftable members to effect relative movement of said gear shifting members; means for moving said shiftable members into different positions in relation to said cams; and means, controllable by the operator for predetermining the operation of said moving means and through which said positions of said members may be selected.

12. A gear shifting device comprising gearing for establishing a plurality of driving relations, and means for shifting said gears to establish any of said relations, said means comprising gear shifting members in operative connection with the gears to be shifted, shiftable members in operative connection with said gear shifting members; cams being adapted to actuate said shiftable members to effect relative movement of said gear shifting members; means for moving said shiftable members into different positions in relation to said cams; a pedal; releasing means operatively connected with said cams and pedal, and provided to release the cams from said shiftable members to permit the shifting thereof, said releasing means being connected to said pedal so that the initial movement of the pedal will be ineffective to operate the releasing means; means connected to and operated by the releasing means, and operating to shift said shiftable members, means operating thereafter to actuate said cams into engagement with said shiftable member and operating the same to shift said gears through said gear shifting members.

13. A gear shifting device comprising gearing for establishing a plurality of driving relations and means for shifting said gears to establish any of said relations, said means comprising gear shifting members in operative connection with the gears to be shifted, shiftable members in operative connection with said gear shifting members, cams adapted to actuate said shiftable members to effect relative movement of said gear shifting members; means for moving said shiftable members into different positions in relation to said cams; and means under the control of the operator for predetermining the operation of the moving means and through which the positions of the shiftable members, in relation to the cams, may be selected.

14. A gear shifting device comprising gearing for establishing a plurality of driving relations, and means for shifting said gears to establish any of said relations, said means comprising gear shifting members in operative connection with the gears to be shifted, shiftable members in operative connection with said gear shifting members; cams being adapted to actuate said shiftable members to effect relative movement of said gear shifting members; means for moving said shiftable members into different positions in relation to said cams; a pedal; releasing means operatively connected with said cams and pedal, and provided to release the cams from said shiftable members to permit the shifting thereof, said releasing means being connected to said pedal so that the initial movement of the pedal will be ineffective to operate the releasing means; means connected to and operated by the releasing means, and operating to shift said shiftable members, means operating thereafter to actuate said cams into engagement with said shiftable member and operating the same to shift said gears through said gear shifting members; and means under the control of the operator through which the positions of the shiftable members, in relation to the cams, can be controlled.

15. A gear shifting device comprising gearing for establishing a plurality of driving relations and means for shifting said gears to establish any of said relations, said means comprising the combination of a gear selective mechanism under the control of the operator through which said means may be operated to permit the selection of the desired driving relation, a gear selecting and clutch operating pedal, a gear shifting mechanism arranged to be actuated into operative position by said pedal; and means arranged to be actuated into active position by said pedal and through the operation of which the selected driving relation may be established.

In testimony whereof I have signed my name to this specification.

WALTER F. MOTTIER.